US005178943A

United States Patent [19]

Asai et al.

[11] Patent Number: 5,178,943
[45] Date of Patent: Jan. 12, 1993

[54] BIAXIALLY ORIENTED POLYESTER FILM

[75] Inventors: Takeo Asai, Sagamihara; Tadashi Ono, Yokohama, both of Japan

[73] Assignee: Teijin Limited, Osaka, Japan

[21] Appl. No.: 489,082

[22] Filed: Mar. 5, 1990

[30] Foreign Application Priority Data

Mar. 6, 1989 [JP] Japan .................................. 1-52120

[51] Int. Cl.⁵ .................................................. B23B 5/16
[52] U.S. Cl. ...................................... 428/330; 428/142; 428/143; 428/323; 428/480; 428/644; 428/900; 428/910
[58] Field of Search .............. 428/480, 900, 141, 143, 428/402, 694, 403, 323, 330, 910

[56] References Cited

U.S. PATENT DOCUMENTS

| | | | |
|---|---|---|---|
| 4,761,327 | 8/1988 | Hamano et al. | 428/220 |
| 4,818,581 | 4/1989 | Katoh et al. | 428/143 |
| 4,886,703 | 12/1989 | Hasumi et al. | 428/900 |
| 4,937,224 | 6/1990 | Yamagishi et al. | 503/227 |

FOREIGN PATENT DOCUMENTS 0186456 7/1986 European Pat. Off. .
62-218969 9/1987 Japan .
63-115792 5/1988 Japan .

OTHER PUBLICATIONS

Chemical Abstracts, vol. 108, No. 20, May 16, 1988, Abstract No. 177252h.

Primary Examiner—Paul J. Thibodeau
Assistant Examiner—R. Follett
Attorney, Agent, or Firm—Wenderoth, Lind & Ponack

[57] ABSTRACT

A biaxially oriented polyester film composed of an intimate mixture of an aromatic polyester, barium sulfate particles having an average particle diameter of 0.1 to 10 micrometers, and an alkali metal or alkaline earth metal salt of a higher fatty acid having 8 to 34 carbon atoms. The fatty acid metal salt has a melting point in the range of 120° to 320° C. The biaxially oriented polyester film has substantially no difference in surface properties such as roughness and the degree of gloss between its surface and back, and can be produced industrially advantageously with high producibility and excellent operability.

9 Claims, No Drawings

BIAXIALLY ORIENTED POLYESTER FILM

This invention relates to a biaxially oriented polyester film, and more specifically, to a biaxially oriented polyester film containing barium sulfate particles and a higher fatty acid metal salt.

Polyesters typified by polyethylene terephthalate have excellent physical and chemical properties, and find extensive use as fibers, films and other shaped articles. In film applications, white films are used as substrates of cards, labels, display boards, white boards, photographic papers and image-forming papers, and opalescent films having light perviousness and light diffusing property as substrates of electrically decorative boards, substrates for drafting and substrates of labels.

It has been well known that to obtain white or opalescent films, suitable amounts of white inorganic particles are included into polyesters. Typical examples of the white inorganic particles include titanium oxide, calcium carbonate, barium sulfate, calcium sulfate and talc. For obtaining opalescent films, silicon dioxide may also be used.

Japanese Patent Publication No. 30930/1985 discloses an image-forming photosensitive material composed of a non-transparent polyester substrate film containing 5 to 50% by weight, based on the polyester, of barium sulfate fine particles having an average particle diameter of 0.5 to 10 micrometers and 99.9% of which have a particle diameter of not more than 50 micrometers, voids existing around the fine particles of barium sulfate, and superimposed on one surface of the substrate polyester film, a photosensitive image-forming layer.

A biaxially oriented polyester film containing fine particles of barium sulfate dispersed therein, because of its softness, suppleness and pearlescent luster attributed to void formation, can be expected to find applications as an image-forming photosensitive material, for example as a base of a photographic paper and a base of films for various hard copies.

However, the problem with the biaxially oriented polyester film containing fine particles of barium sulfate is that its surface properties, such as surface roughness and the degree of gloss, differ between its surface and back. The difference increases with increasing film thickness, and becomes particularly marked when the thickness of the unstretched film is 1 mm or more. In addition, as the thickness of the unstretched film increases, its stretchability is reduced accordingly, and the frequency of film breakage increases.

It is an object of this invention to provide a biaxially oriented polyester film having a novel composition.

Another object of this invention is to provide a biaxially oriented polyester film having substantially no difference in surface properties such as surface roughness and the degree of gloss between its surface and back.

Still another object of this invention is to provide a biaxially oriented polyester film which can be produced industrially advantageously with high producibility and excellent operability.

Other objects of this invention along with its advantages will become apparent from the following description.

In accordance with this invention, the above objects and advantages of the invention are achieved by a biaxially oriented polyester film comprising of an intimate mixture of
- (a) an aromatic polyester,
- (b) 1 to 100 parts by weight, per 100 parts by weight of the aromatic polyester, of barium sulfate particles having an average particle diameter of 0.1 to 10 micrometers, and
- (c) 0.002 to 0.05 mole, per mole of barium sulfate, of an alkali metal or alkaline earth metal salt of a higher fatty acid having 8 to 34 carbon atoms, said fatty acid metal salt having a melting point in the range of 120° to 320° C.

Investigations of the present inventors have shown that when a conventional polyester is melted and extruded onto a casting drum through a die and quenched and solidified to form an unstretched film, its surface or surface layer on that side which did not contact the casting drum is crystallized or is liable to be crystallized, but that if a certain type of fatty acid metal salt is used together with the barium sulfate particles, the action of the barium sulfate particles to promote crystallization of the polyester during temperature fall can be inhibited, and therefore that the film does not break in the stretching step and the film can be stably stretched biaxially to give a biaxially oriented polyester film having substantially no difference between its surface and back. This finding constitutes the basis of providing the biaxially oriented polyester film of this invention.

The aromatic polyester (a) constituting the biaxially oriented polyester film of this invention is preferably derived from an aromatic dicarboxylic acid as a main acid component and an alkylene glycol having 2 to 10 carbon atoms as a main glycol component.

Examples of the aromatic dicarboxylic acid include terephthalic acid, isophthalic acid, naphthalenedicarboxylic acid, diphenoxyethanedicarboxylic acid, diphenyldicarboxylic acid, diphenyletherdicarboxylic acid, diphenylsulfonedicarboxylic acid, diphenylketonedicarboxylic acid and anthracenedicarboxylic acid. The terephthalic acid and naphthalene-2,6-dicarboxylic acid are particularly preferred.

Examples of the alkylene glycol include alkylene glycols having 2 to 10 carbon atoms, such as ethylene glycol, trimethylene glycol, tetramethylene glycol, pentamethylene glycol and hexamethylene glycol. Of these, ethylene glycol and tetramethylene glycol are especially preferred.

The aromatic polyester composed of the aromatic dicarboxylic acid component and the glycol component can be produced by the following method of producing polyethylene terephthalate taken as an example. This method comprises a first step of forming a glycol ester of terephthalic acid and/or its low polymer by directly esterifying terephthalic acid and ethylene glycol, esterinterchanging dimethyl terephthalate and ethylene glycol or by reacting terephthalic acid with ethylene oxide, and a second step of polycondensing the reaction product of the first step.

The aromatic polyester used in this invention may have a third component copolymerized or blended therewith. When the third component is to be copolymerized, its amount is usually limited to, preferably, not more than 20 mole % of the total amount of the acid component. If the third component is to be blended, its amount is desirably limited to not more than 20% by weight based on the entire composition.

Examples of the third component include aliphatic dicarboxylic acids, alicyclic dicarboxylic acids, aromatic dioxy compounds, alicyclic glycols, aliphatic glycols having an aromatic ring, polyalkylene glycols, aliphatic hydroxycarboxylic acids, aromatic hydroxycarboxylic acids, functional derivatives of these compounds, polyethers, polyamides, polycarbonates and polyolefins.

The above aromatic polyesters include those to which trifunctional or higher compounds, or monofunctional compounds are bonded in such proportions that the resulting polyesters are regarded as being substantially linear. They may contain catalysts and stabilizers, and as required antioxidants, plasticizers, dispersants and antistatic agents.

The aromatic polyester used in this invention is preferably a polyester derived from terephthalic acid as a main acid component and ethylene glycol as a main glycol component, typically polyethylene terephthalate.

The barium sulfate particles (b) constituting the biaxially oriented polyester film of the invention have an average particle diameter of 0.1 to 10 micrometers.

The barium sulfate particles that can be used are not limited by the method of preparation. For example, precipitated barium sulfate and water-ground barium sulfate are preferably used. These barium sulfate particles can be easily obtained commercially. The barium sulfates should have an average particle diameter of 0.1 to 10 micrometers, preferably 0.3 to 5 micrometers. If the average particle diameter of barium sulfate falls outside the range of 0.1 to 10 micrometers, the film-formability of the polyester and the surface properties of the biaxially oriented polyester film of the invention are outside the scope of the invention.

Preferably, the barium sulfate particles have a sharp particle diameter distribution. For this reason, before mixing them with the aromatic polyester, the barium sulfate particles may be subjected to a classifying treatment such as a filtration method, a precipitation classifying method, a wind classifying method or a sand grinding method. In the cumulative particle diameter distribution curve taken from larger diameters, the ratio of the particle diameter at 75 cumulative % by weight ($D_{75}$) to that at 25 cumulative % by weight ($D_{25}$), $D_{75}/D_{25}$, is from 0.4 to 0.9, preferably from 0.4 to 0.8.

The barium sulfate particles are present in a proportion of 1 to 100 parts by weight, preferably 2 to 33 parts by weight, per 100 parts by weight of the aromatic polyester. This proportion is determined from the standpoint of ensuring good film stretching property and good film properties (such as surface roughness, gloss, dynamic properties, etc.).

The proportion of the barium sulfate particles is desirably 2 to 5% by weight for an application in which the transmission and diffusion of light are utilized as in electrically decorative board, and 15 to 20% by weight in an application in which the light shielding properties are utilized as in a white card or a photographic paper base (a support for a photographic emulsion layer).

The higher fatty acid metal salt (c), another component of the biaxially oriented polyester film of the invention, is present in a proportion of 0.002 to 0.05 mole, per mole of barium sulfate.

The higher fatty acid metal salt (c) is an alkali metal or alkaline earth metal salt of a higher fatty acid having 8 to 34 carbon atoms and has a melting point of 120° to 320° C.

The higher fatty acid may be saturated or unsaturated, and preferably has 8 to 18 carbon atoms. Higher fatty acid metal salts having a melting point of less than 120° C. are undesirable because they are prone to evaporate during the melt extrusion of the polyester, during the film formation, and the heat causes the higher fatty acid metal salt to bleed out to the film surface and will contaminate the surface of rolls during film formation. On the other hand, higher fatty acid metal salts having a melting point higher than 320° C. are difficult to disperse uniformly in the polyester. The preferred melting point of the higher fatty acid metal salts is 150° to 280° C. Further, in relation to the polyester forming the film, the melting point of the higher fatty acid metal salt desirably should not be 50° C. or more higher than the melting point of the polyester, and preferably not higher than the melting point of the polyester by 20° C.

Examples of suitable higher fatty acid metal salts are saturated higher fatty acid salts such as calcium pelargonate, calcium laurate, barium laurate, magnesium laurate, lithium laurate, barium stearate, lithium stearate, sodium stearate, magnesium stearate, calcium stearate, sodium palmitate, magnesium palmitate, potassium palmitate and sodium montanate. Preferred are barium stearate and lithium stearate.

The amount of the higher fatty acid metal salt is 0.002 to 0.05 mole, preferably 0.005 to 0.05 mole, per mole of barium sulfate. If it is less than 0.002 mole, it cannot give rise to the substantial affect of inhibiting the crystallization of the polyester during temperature fall. On the other hand, if it exceeds 0.05 mole, the effect of inhibiting the crystallization of the polyester nearly reaches saturation, and does not further increase. If the proportion further increases, the inhibiting effect rather tends to decrease.

The biaxially oriented polyester film of this invention can be produced from an intimate mixture of the aromatic polyester, barium sulfate and the higher fatty acid metal salt. This intimate mixture may be produced, for example, by adding barium sulfate particles and the higher fatty acid metal salt during the polyester production, particularly to the esterification product or the ester-interchange product, or to the polyester as produced. It may also be produced by preparing a polyester containing one of the additives, then adding the other additive, and melt-kneading the resulting mixture, or by preparing a polyester containing one of the additives and a polyester containing the other additive, and melt-kneading the two polyesters, or by melt-kneading polyester chips with barium sulfate particles and the higher fatty acid metal salt simultaneously.

The last method described above is preferred because the effect of inhibiting the crystallization of the polyester is higher than the other methods. As a modified version of this method, there may be advantageously used a method comprising preparing master chips containing barium sulfate particles and the higher fatty acid metal salt in a predetermined ratio in high concentrations and melt-kneading them with polyester chips not containing these additives.

As required, the above intimate mixture may contain a suitable amount of inorganic fine particles other than the barium sulfate particles for improving the hiding property (light shielding property) of the biaxially oriented film or controlling its surface roughness, or a fluorescent bleaching agent, a colored pigment or a dye to control the color of the film.

The biaxially oriented polyester film can be produced by a successive biaxial stretching method, a simultaneous biaxial stretching method, or an inflation method. The successive biaxial stretching method is preferred.

In the successive biaxial stretching method or the simultaneous biaxial stretching method, the intimate mixture is melt-extruded through a die and quenched and solidified on a casting drum kept at about 20° to 40° C. to obtain an unstretched film. At this time, that surface of the film which makes contact with the surface of the casting drum is quenched, but cooling of its opposite side is retarded. In particular, when the thickness of the unstretched film is 1 mm or larger, this retardation becomes marked, and crystallization proceeds in this surface (opposite side). As a result, the surface of the film after biaxial stretching becomes rough, and the resulting film markedly differs in surface properties between its surface and back. This phenomenon can be observed to some extent when the film does not contain barium sulfate particles. It is very conspicuous when the film contains barium sulfate particles. Furthermore, since the processability of the film is degraded, the film tends to break.

The above phenomenon can be avoided or reduced in this invention by using the above intimate mixture containing barium sulfate particles and the higher fatty acid metal salt. However, forced cooling of the film by blowing cold air at a high speed against the unstretched film on the casting drum from an air side surface (that surface which is opposite to that surface which is in contact with the casting drum) is desirable in the production of the film of the invention.

The unstretched film used desirably has a thickness of at least about 1 mm, for example 1.1 to 3.0 mm.

The unstretched film is then stretched under conditions generally well known. For example, it is stretched in one direction to 1.5 to 4.5 times, and in a direction at right angles thereto to 1.5 to 4.5 times at an area ratio of 6 to 15. The stretching temperature is preferably 20° to 70° C. higher than the glass transition temperature (Tg) of the polyester constituting the film. As required, after biaxial stretching, the film may be heat-set. The heat-setting temperature is preferably 15° to 100° C. lower than the melting point of the polyester.

The resulting biaxially oriented polyester film of this invention preferably has a thickness of, for example, 100 to 300 micrometers.

Thus, the present invention can provide a biaxially stretched polyester film containing barium sulfate particles having substantially no diffrence in surface properties (particularly, surface roughness and the degree of gloss) between its surface and back while retaining the advantages of conventional biaxially oriented films containing barium sulfate particles.

The biaxially oriented polyester films of the invention has the advantage that it can be produced with stable processability. The biaxially oriented polyester film of the invention can be utilized as substrates of cards, labels, display boards, white boards, photographic papers and image-forming papers, electrically decorative boards, and drafting.

The following examples illustrate the present invention in further detail. All parts in these examples are by weight, and the various properties are measured by the following methods.

(1) Inherent Viscosity

The polymer was dissolved in ortho-chlorophenol, and its solution viscosity was measured at 35° C. The inherent viscosity was determined from the solution viscosity.

(2) Crystallization Temperature During Temperature Fall Tcd (°C)

About,10 g of film was sampled from a film sample, melted at 290° C., and quenched to form a measurement sample. By using DSC/20 Type made by Seiko Denshi Kogyo Co., Ltd., the temperature of the sample was elevated to 290° C. at a rate of 20° C./min., and the sample was maintained at this temperature for 2 minutes. Then, its temperature was lowered at a rate of 20° C./min., and its crystallization temperature was measured.

(3) Surface Roughness Ra (Micrometers)

A surface roughness tester SE-30C (made by Kosaka Kenkyusho K.K.) was used, and the surface roughness was measured in accordance with JIS B 0601-1976. The number of measured samples (n) was 5. The maximum measured value was excluded, and the average value of the remaining four measured values was calculated and defined as the centerline average roughness Ra.

(4) DEGREE OF GLOSS GS (60°)

Measured in accordance with JIS Z 8741-1962 by using a glossmeter (GM-3D made by Murakami Color Technology Laboratory Co., Ltd.). The measuring angle was adjusted to 60°, and the number of measuring samples was 5. The average values of the five measured samples was defined as the degree of gloss Gs (60°).

(5) Melting Point (°C)

Measured by using a micro-melting point apparatus made by Yanagimoto Seisakusho K. K.

(6) Average Particle Diameter of the Particles

The particles were subjected to a centrifugal particle size analyzer (Model CAPA-500 made by Horiba Seisakusho Co., Ltd.). From the cumulative curve of particles of the individual diameters and their amounts calculated on the basis of the resulting centrifugal sedimentation curve, a particle diameter corresponding to a 50 mass percent was read and defined as the average particle diameter of the particles (see "Particle Size Measuring Technique", pages 242-247, 1975, published by Nikkan Kogyo Press).

(7) Sharpness of the Particle Diameter Distribution

In the cumulative curve obtained in the above average particle diameter measurement, the weight percents of particles integrated beginning with larger particles. The particle diameters corresponding to 25% and 75% of the entire particle weight are defined as $D_{25}$ and $D_{75}$, respectively. The sharpness S of the particle size distribution is defined by the following equation.

$$S = \frac{D_{75}}{D_{25}}$$

(8) Break Strength, Break Elongation and F-5 Value

A film sample, 10 mm in width, and 150 mm in length, was taken. It was pulled by a Instron type universal tensile tester at a pulling speed of 100 mm/min. with an interchuck distance of 100 mm, and a chart speed of 100 mm/min. until the film broke. The strength and elongation of the film at break are the break strength and break elongation. The strength of the film at 5% stretch was divided by the sectional area of the initial sample, and the quotient was defined as F-5 value.

EXAMPLES 1-3 AND COMPARATIVE EXAMPLES 1 and 2

A reactor was charged with 96 parts of dimethyl terephthalate, 58 parts of ethylene glycol, 0.038 part of manganese acetate and 0.041 part of antimony trioxide, and with stirring, ester-interchange reaction was carried out until the temperature of the inside of the reactor reached 240° C. while methanol was distilled. After the ester-interchange reaction was terminated, 0.097 part of trimethyl phosphate was added. Subsequently, the reaction product was heated, and polycondensed under high vacuum at 280° C. finally to give a polyester having an inherent viscostiy of 0.64 (polyester A).

The polyester A and fine particles of precipitated barium sulfate having an average particle diameter of 0.7 micrometers were respectively dried at 170° C. for 3 hours, and fed into a twin-screw extruder so that the concentration of barium sulfate was 40% by weight, and melt-kneaded at 280° C. The mixture was quenched and solidified to give master chips (to be referred to as polyester B).

The polyester A was dried at 170° C. for 3 hours, and barium stearate was dried at 120° C. for 1 hour. They were fed into a twin-screw extruder s that the concentration of barium stearate in the polymer was 3% by weight. They were melt-kneaded at 280° C., and quenched and solidified to obtain master chips (to be referred to as polyester C).

Polyesters A, B and C were blended and dried at 160° C. so that the concentration of barium sulfate in the polymer reached 20% by weight and the amount in mole per mole of barium sulfate, of barium stearate was as shown in Table 1. The mixture was then melt-extruded at 280° C., and quenched and solidified on a casting drum kept at 40° C. to obtain an unstretched film. The unstretched film was stretched longitudinally to 3.3 times at 90° C., and then transversely to 3.6 times at 105° C. The stretched film was heat-treated at 235° C. to give a biaxially oriented film having a thickness of 200 micrometers. The properties of the films obtained are shown in Table 1.

COMPARATIVE EXAMPLE 3

Example 1 was repeated except that polyester C was not used (i.e., barium stearate was not included into the polymer). Thus, a biaxially oriented film having a thickness of 200 micrometers was obtained. During film formation, especially in the step of longitudinally stretching the unstretched film, stretching unevenness occurred, and the film frequently broke. The properties of the film are shown in Table 1.

EXAMPLE 4 AND 5

Polyester A and precipitated barium sulfate having an average particle diameter of 0.7 micrometer were dried at 170° C. for 3 hours, and barium stearate was dried at 120° C. for 1 hour. Then, these materials were fed into a twin-screw extruder so that the concentration of barium sulfate in the polymer reached 40% by weight, and the amount in moles of barium stearate per mole of barium sulfate was as shown in Table 1. They were melt-kneaded at 280° C. and quenched and solidified to form master chips (to be referred to as polyester D).

Then, polyester A was blended with the polyester D so that the concentration of barium sulfate in the polymer was 18% by weight (the amount of barium stearate was as shown in Table 1). The blend was worked up in the same way as in Example 1 to give biaxially stretched films. The properties of the films are shown in Table 1.

EXAMPLE 6

Example 4 was repeated except that lithium stearate in the amount shown in Table 1 was used instead of barium stearate. A biaxially oriented film having a thickness of 200 micrometers was obtained. Its properties are shown in Table 1.

It is seen from the results given in Table 1 that the films obtained in the Examples are biaxially oriented films containing fine particles of barium sulfate, and they had very little differences in surface properties between the surface and back, and that the films were obtained with stable processability.

TABLE 1

| Run No. | Concentration of barium sulfate (wt. %) | Fatty acid metal salt Main component | Moles | Time of adding the fatty acid salt | Thickness of the film (μm) | Crystallization temperature, Tcd (°C.) | Surface roughness Ra (μm) D surface | Surface roughness Ra (μm) A surface |
|---|---|---|---|---|---|---|---|---|
| Example 1 | 20 | A | 0.010 | X | 200 | 214 | 0.051 | 0.057 |
| Example 2 | 20 | A | 0.015 | X | 200 | 210 | 0.050 | 0.054 |
| Example 3 | 20 | A | 0.030 | X | 200 | 213 | 0.051 | 0.053 |
| Comparative Example 1 | 20 | A | 0.001 | X | 200 | 221 | 0.053 | 0.067 |
| Comparative Example 2 | 20 | A | 0.070 | X | 200 | 219 | 0.052 | 0.053 |
| Comparative Example 3 | 20 | A | 0 | — | 200 | 222 | 0.052 | 0.069 |
| Example 4 | 18 | A | 0.005 | Y | 200 | 204 | 0.051 | 0.053 |
| Example 5 | 18 | A | 0.015 | Y | 200 | 205 | 0.052 | 0.054 |
| Example 6 | 18 | B | 0.020 | Y | 200 | 207 | 0.052 | 0.055 |

| Run No. | Degree of gloss, Gs (60° C.) (%) D surface | Degree of gloss, Gs (60° C.) (%) A surface | Break strength (kg/mm²) MD | Break strength (kg/mm²) TD | Break elongation (%) MD | Break elongation (%) TD | F-5 value (kg/mm²) MD | F-5 value (kg/mm²) TD |
|---|---|---|---|---|---|---|---|---|
| Example 1 | 62 | 54 | 15.2 | 16.3 | 83 | 80 | 10.2 | 10.3 |
| Example 2 | 63 | 57 | 15.0 | 16.5 | 80 | 79 | 10.3 | 10.3 |
| Example 3 | 62 | 59 | 15.5 | 16.3 | 85 | 81 | 10.5 | 10.7 |
| Comparative Example 1 | 61 | 43 | 15.0 | 16.3 | 80 | 78 | 9.8 | 10.0 |
| Comparative Example 2 | 61 | 57 | 15.1 | 16.0 | 82 | 78 | 9.7 | 10.0 |
| Comparative | 61 | 42 | 14.9 | 16.1 | 79 | 77 | 9.5 | 9.8 |

TABLE 1-continued

| | | | | | | | | |
|---|---|---|---|---|---|---|---|---|
| Example 3 | | | | | | | | |
| Example 4 | 63 | 58 | 16.3 | 17.4 | 97 | 91 | 9.9 | 10.1 |
| Example 5 | 63 | 57 | 16.2 | 17.3 | 95 | 90 | 9.9 | 10.1 |
| Example 6 | 62 | 56 | 16.1 | 17.0 | 92 | 90 | 9.7 | 10.0 |

Note
Main component A: barium stearate
Main component B: lithium stearate
Moles: per mole of barium sulfate
Time of addition X: Master chips of polyethylene terephthalate containing barium sulfate and master chips of polyethylene terephthalate containing the fatty acid metal salt were separately prepared, and then blended with master chips of polyethylene terephthalate not containing these additives.
Time of addition Y: Master chips of polyethylene terephthalate to which barium sulfate and the fatty acid metal salt were simultaneously incorporated were prepared and then blended with master chips of polyethylene terephthalate.
D surface: That surface of the film which contacted the surface of the casting drum during film formation.
A surface: The surface opposite to D surface.
MD: Machine direction
TD: The direction at right angles to the machine direction

We claim:

1. A biaxially oriented polyester film comprising of an intimate mixture of
   (a) an aromatic polyester,
   (b) 1 to 100 parts by weight, per 100 parts by weight of the aromatic polyester, of barium sulfate particles having an average particle diameter of 0.1 to 10 micrometers, and
   (c) 0.002 to 0.05 mole, per mole of barium sulfate, of an alkali metal or alkaline earth metal salt of a higher fatty acid having 8 to 34 carbon atoms, said fatty acid metal salt having a melting point in the range of 120° to 320° C.

2. The biaxially oriented polyester film of claim 1 in which the aromatic polyester is a polyester composed of an aromatic dicarboxylic acid as a main acid component and an alkylene glycol having 2 to 10 carbon atoms as a main glycol component.

3. The biaxially oriented polyester film of claim 1 in which the aromatic polyester is polyethylene terephthalate.

4. The biaxially oriented polyester film of claim 1 in which the barium sulfate particles have an average particle diameter of 0.3 to 5 micrometers.

5. The biaxially oriented polyester film of claim 1 in which the barium sulfate particles have such a distribution that in the integrated particle diameter distribution curve, $D_{75}/D_{25}$ is 0.4 to 0.8.

6. The biaxially oriented polyester film of claim 1 which contains 2 to 33 parts by weight of the barium sulfate particles, per 100 parts by weight of the aromatic polyester (a).

7. The biaxially oriented polyester film of claim 1 in which said higher fatty acid in (c) is a saturated fatty acid having 8 to 18 carbon atoms.

8. The biaxially oriented polyester film of claim 1 in which the metal salt of the higher fatty acid is lithium, sodium, calcium or barium stearate.

9. The biaxially oriented polyester film of claim 1 which has a thickness of 100 to 300 micrometers.

* * * * *